United States Patent
Edwards et al.

(10) Patent No.: US 6,216,010 B1
(45) Date of Patent: Apr. 10, 2001

(54) UP-LINK POWER CONTROL FOR FIXED WIRELESS ACCESS

(75) Inventors: Keith Russell Edwards, Devon; David Andrew James Pearce, York, both of (GB)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/107,354

(22) Filed: Jun. 30, 1998

(30) Foreign Application Priority Data

Nov. 14, 1997 (GB) .................................... 9724046

(51) Int. Cl.[7] .................................................. H04B 7/00
(52) U.S. Cl. .............................................. 455/522; 455/63
(58) Field of Search .................. 455/67.1, 522, 455/69, 127, 63, 115, 422, 446; 370/318, 320, 342

(56) References Cited

U.S. PATENT DOCUMENTS

| | | | |
|---|---|---|---|
| 5,539,728 | * | 7/1996 | Gaiani et al. ............... 370/18 |
| 5,579,373 | * | 11/1996 | Jang ......................... 379/59 |
| 5,710,758 | * | 1/1998 | Soliman et al. ............ 370/241 |
| 5,722,051 | * | 2/1998 | Agrawal et al. ............ 455/69 |
| 5,729,538 | * | 3/1998 | Dent ......................... 370/347 |
| 5,729,557 | * | 3/1998 | Gardner et al. ............ 371/41 |
| 5,757,787 | * | 5/1998 | Dent ......................... 370/330 |
| 5,787,352 | * | 7/1998 | Benveniste ................. 455/452 |
| 5,798,631 | * | 8/1998 | Spee et al. ................. 322/25 |
| 5,991,636 | * | 11/1999 | Won et al. ................. 455/522 |
| 6,021,309 | * | 2/2000 | Sherman et al. ........... 455/12.1 |
| 6,026,081 | * | 2/2000 | Hamabe .................... 370/335 |
| 6,091,933 | * | 7/2000 | Sherman et al. ........... 455/13.1 |

FOREIGN PATENT DOCUMENTS

| | | |
|---|---|---|
| 0236759 A2 | 9/1987 | (EP) . |
| WO94/06218 | 3/1994 | (WO) . |

\* cited by examiner

Primary Examiner—Reinhard J. Eisenzopf
Assistant Examiner—Naghmeh Mehrpour
(74) Attorney, Agent, or Firm—Lee, Mann, Smith, McWilliams, Sweeney & Ohlson

(57) ABSTRACT

This invention relates to radio communication networks and more particularly, to up-link power control for fixed wireless access communication networks. In accordance with one aspect of the invention there is provided a radio communications uplink power control system wherein distance information between an outstation and a base station and information relating to channel loss is employed by a power control algorithm whereby the signal power transmitted can be optimally controlled. The present invention provides a power control strategy which adapts not only to the total channel loss, but separately to the components of this loss. The total channel loss is calculated from the difference in the received signal power and the transmitted signal power (which is encoded in the message, or sent in addition to the message and therefore known to the receiving station). A method of operation is also disclosed.

11 Claims, 2 Drawing Sheets

UP-LINK POWER CONTROL FOR FIXED WIRELESS ACCESS

TECHNICAL FIELD

This invention relates to radio communication networks and more particularly, but not exclusively, to up-link power control for fixed wireless access communication networks.

BACKGROUND

Power control in general covers the aspects of a system to modify the transmission power of the uplink and downlink transmissions, which are, respectively, the link from an outstation to a base station and from the base station to the outstation. Effective power control improves spectral efficiency and reduces power consumption. In the case of battery powered radio outstations this has a direct consequence of extending battery life. Further, it is advantageous to maintain the received signals at a similar level to reduce system complexity and to reduce interference with adjacent cells.

Obstacles in a signal path, such as buildings in built-up areas and hills in rural areas, act as signal scatterers and can cause signalling problems. These scattered signals interact and their resultant signal at a receiving antenna is subject to deep and rapid fading and the signal envelope often follows a Rayleigh distribution over short distances, especially in heavily cluttered regions.

In radio communications systems such as GSM digital mobile radio system, the communications channel hops from one frequency band to another according to a specified routine. In GSM, the transmission frequency remains the same during the transmission of a whole burst; GSM therefore operates as a slow frequency hopping communication system. Slow frequency hopping is used for frequency diversity and interference diversity. In the GSM system, at the start of a connection, the initial transmission powers for both the outstation and the base station are selected. A single access burst is received and feedback arrangement determines the required power to be transmitted despite the single access burst being of limited accuracy. The initial power level to be used by an outstation for the first message but on a new dedicated channel is fixed on a cell-by-cell basis. The transmission power is adjusted in stages of 2 dB, recurring not more often than 60 ms: reactions to large differences in power are not instantaneous.

A receiver moving through this spatially varying field experiences a fading rate which is proportional to its speed and the frequency of the transmission. Since the various components arrive from different directions, there is also a Doppler spread in the received spectrum. If the channel allocation is static, then as the subscriber, for example, moves to an urban environment where signal reflections affect the particular frequency in which the channel is operating more than other frequencies, then the channel which was previously best then becomes poor. In fact such movement may produce a break in communications.

In Fixed Wireless Access applications, the problems of shadowing loss are somewhat equivalent to fading loss (the term shadowing loss is more accurately employed instead of fading, since shadowing losses cover static/slowly varying losses whereas fading losses tend to be rapidly varying and short term); in a fixed system, the best channel would be likely to stay the best signal for a period of time. Frequently, the shadowing follows a Rayleigh distribution. In present Fixed Wireless Access systems, power control is carried out to power balance so that all users arrive at the same nominal power at the base station receiver. This is an acceptable method but does not allow for the observed relationship between excess path loss (over free space) and fading (Definition of excess path loss : actual path loss from subscriber to base—calculated path loss from outstation to base station assuming an $R^2$ propagation law). Previously, the transmit power from each subscriber has been determined by an equation of the form:

$$P_t = L$$

Where P is the power transmitted by the fixed stations, L is the total channel loss due to shadowing and distance loss, and $\alpha$ is a real number. As discussed above, this simplistic approach has not always been the most useful.

In a Fixed Wireless Access system, system planners should be able to determine the position of a subscriber in advance of deployment; that is to say, the knowledge of the position of a subscriber can be employed in a system power control algorithm. This would enable the channel loss due to distance effects and to shadowing effects to be mitigated and to be accounted for in the power control algorithm. It is reasonable to assume that a distant subscriber having a good line of sight link with a base station would have the power control adjusted such that the transmitted power is at as low a level as possible whereby a communications link may be established and maintained. The power control algorithm would act to attenuate the transmitted power since with a reasonable amount of correlation in the shadowing environment, the station would be expected to have line of sight or near line of sight links with other base stations and thus provide a source of interference to those other base stations. In the alternative, a station with the same total channel loss, but heavily shadowed and close to the desired base station, would not provide much interference in neighbouring cells and would not require its output to be attenuated in the same way.

OBJECT OF THE INVENTION

Accordingly it is an object of the present invention to ameliorate the above disadvantages.

It is further an object of the present invention to provide a power control system which estimates the degree of excess loss suffered on an uplink communication.

SUMMARY OF INVENTION

In accordance with a first aspect of the present invention, there is provided a radio communications uplink power control system wherein distance information between an outstation and a base station and information relating to channel loss is employed by a power control algorithm whereby the signal power transmitted can be optimally controlled. The power control system can thus estimate the degree of excess loss suffered on a communication link between an outstation and a base station and thereby adjust the power control accordingly. The system can be a fixed wireless access system.

Preferably the algorithm is of the form:

$$\text{Transmit Power} = \text{Constant} \times (\text{LossSI})^\alpha \times (\text{LossFS})^\beta,$$

where:

the loss due to free-space distance is LossFS;

the loss due to shadowing and interference is LossSI; and $\alpha$ and $\beta$ are constant parameters specifying the system.

The constants $\alpha$ and $\beta$ can be determined from a look up table. The constant $\beta$ can be varied on an adaptive basis.

In accordance with another aspect of the present invention there is provided a radio communications network power control system, the network comprising a base station and a out station, wherein: information relating to the distance between an outstation and a base station and;

information relating to channel excess loss is employed by the following power control algorithm;

$$\text{Transmit Power} = \text{Constant} \times (\text{LossSI})^\alpha \times (\text{LossFS})^\beta,$$

where:

the loss due to free-space distance is LossFS;

the loss due to shadowing and interference is LossSI; and

α and β are constant parameters specifying the system whereby the power control system can thereby adjust the power control accordingly.

In accordance with a still further aspect of the present invention, there is provided a method of estimating the excess loss encountered on a communication link between an outstation and a base station subscribers with the largest excess loss are controlled to arrive at a higher average power than those links with a small excess loss.

DESCRIPTION OF THE DRAWINGS

In order that the present invention can be more fully understood and to show how the same may be carried in to effect, reference shall no w be made, by way of example only, to the Figures as shown in the accompanying drawing sheets wherein.

DETAILED DESCRIPTION OF THE PREFERRED EMBODIMENTS

There will now be described by way of example the best mode contemplated by the inventors for carrying out the invention. In the following description, numerous specific details are set out in order to provide a complete understanding of the present invention. It will be apparent, however, to those skilled in the art that the present invention may be put into practice with variations of the specific.

Figure 1:
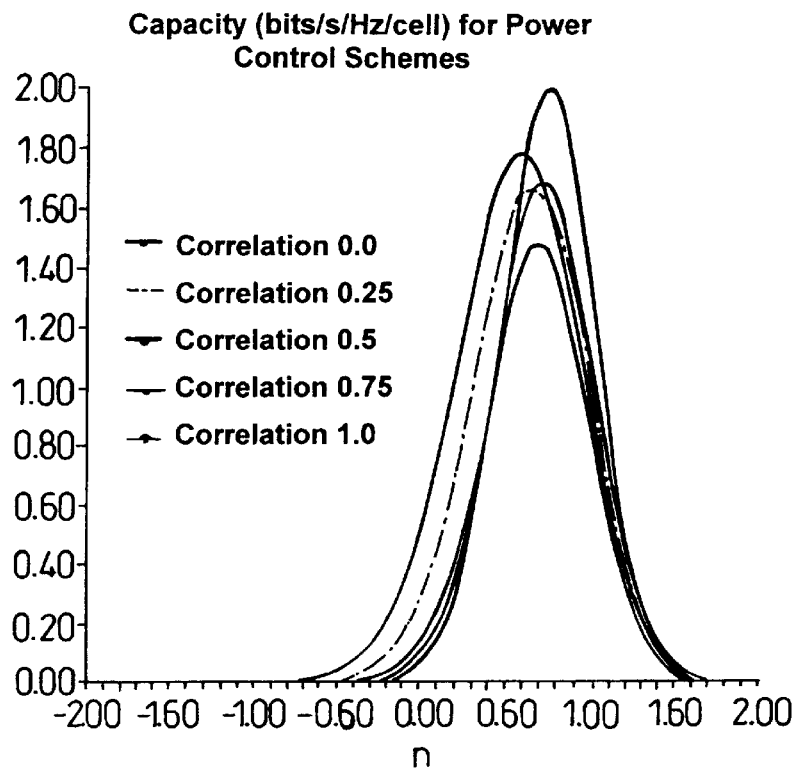
FIG. 1 shows a graph of system capacity relative to power control for a single factor power control algorithm, for different correlation factors.

Referring to FIG. 1 there is shown a graph of system capacity relative to the degree of power control being applied. The graph is determined by the equation:

$$\text{Transmit Power} = (\text{Channel Loss})^n$$

Where n is a power control factor: n=0 is equivalent to a system with no power control; n=1 is equivalent to a system where power balancing is employed. System capacity can be determined as a function of n for various different correlation factors, as shown, and an optimum value (around 0.6) has been determined for fixed wireless access schemes. In situations where fading is more rapid and deep, greater powers are employed. Correlation is the degree to which excess loss experienced between a wanted and an interfering path are related against the expectation that the fading is wholly independent.

A unique feature of fixed wireless access schemes relative to mobile radio schemes is that, since the location of both ends of a wireless link are known, information is available to separately determine the loss due to the distance between the two ends of the link from the loss due to additional factors such as shadowing and multipath interference. The opportunity therefore exists to provide a power control strategy which adapts not only to the total channel loss, but separately to the components of this loss. The total channel loss is calculated from the difference in the received signal power and the transmitted signal power (which is encoded in the message, or sent in addition to the message and therefore known to the receiving station). Knowing the length of the radio path allows the theoretical free space path loss to be determined, and the additional loss due to shadowing and fading is simply the difference between these two losses. Improved performance occurs in schemes where the signal is boosted in heavily shadowed station close to the base station, but not from lightly shadowed stations further away.

If the loss due to free-space distance is Loss FS, and the loss due to shadowing and interference is Loss SI, a general power control scheme taking advantage of the additional information available can be represented as:

$$\text{Transmit Power} = \text{Constant} \times (\text{LossSI})^\alpha \times (\text{LossFS})^\beta,$$

where α and β are cons tant parameters specifying the system. In the case of mobile systems, the power balancing expression can be represented by α=β=1; whereas no power control would be represented by α=β=0. Allowing a and b to vary independently results in increases in the overall capacity of the cellular system. By averaging the measured path loss over time, a better estimate of the excess shadow loss (not short term fading) can be realised. With averaging over a sufficient time period, the loss due to fixed shadowing effects, and that due to varying multipath interference effects can be separated. In this case, the power output can be reduced for those stations whose fading is less deep. $R^N$ (where N is the path loss exponent N:2 ... 4, real number) is a generic definition. The choice of N affects a scaling factor used in the power control algorithm. An $R^2$ law was employed in the calculation to determine excess path loss due to shadowing, since this was the distance loss relationship used in the simulations.

Figure 2:
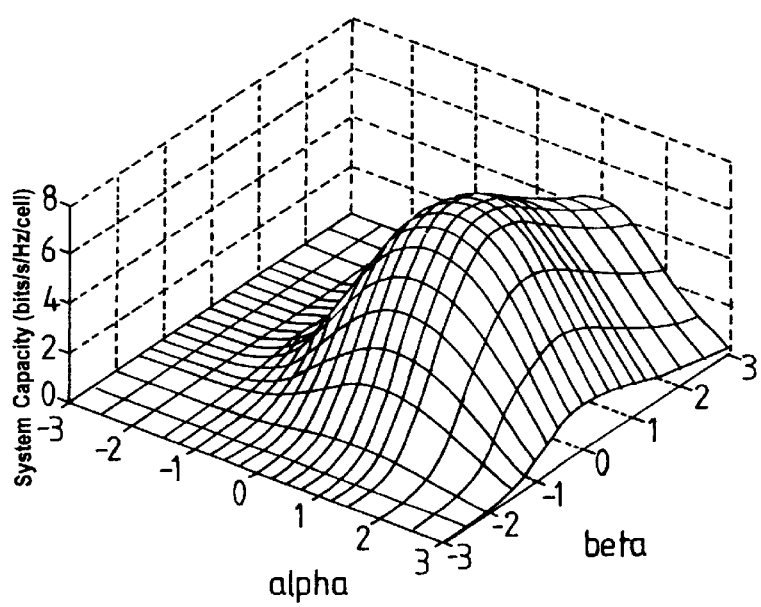
FIG. 2 show s a three-dimensional graph depicting System Capacity as a function of factors α and β for correlation factor=1.0.
Figure 3:
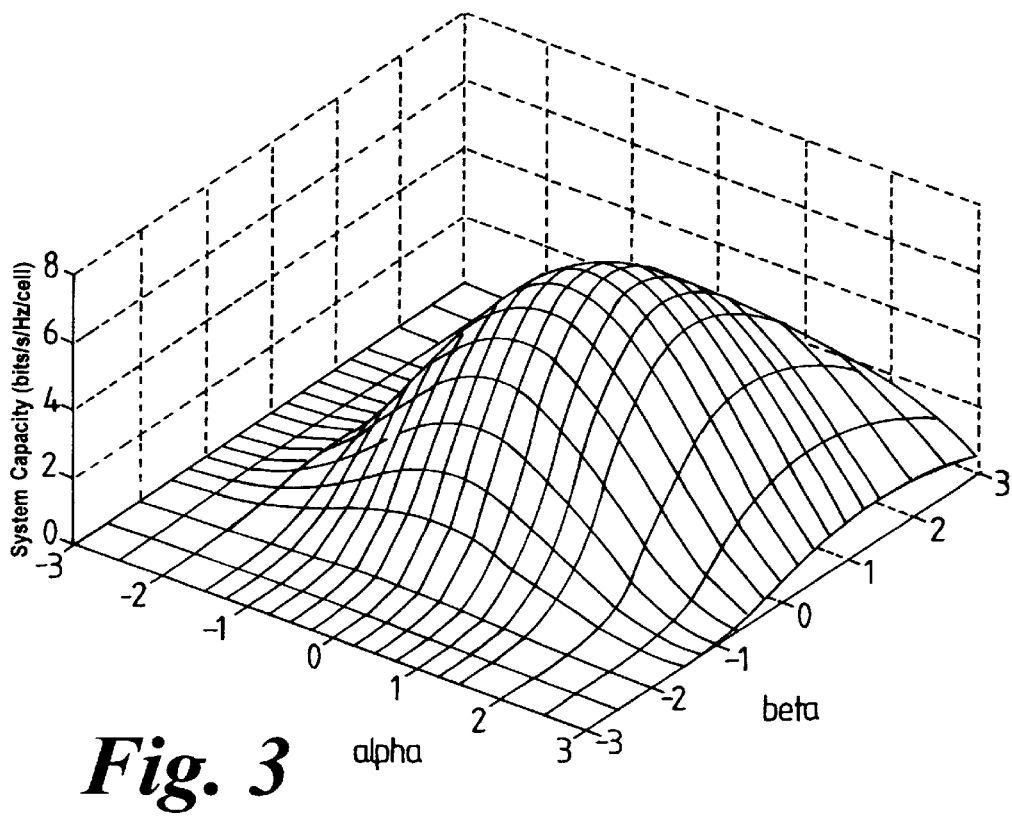
FIG. 3 shows a three-dimensional graph depicting System Capacity as a function of factors α and β for correlation factor=0.5.
Figure 4:
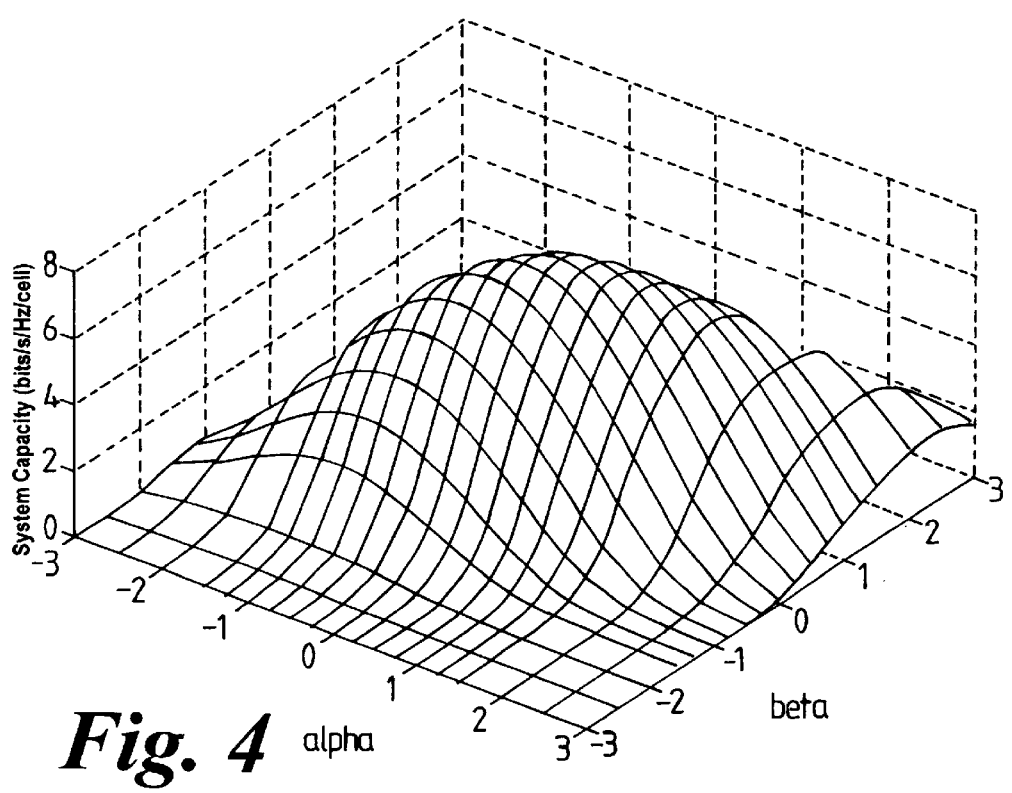
FIGS. 4 shows a three-dimensional graph depicting System Capacity as a function of factors α and β for correlation factor=0.0.

Referring now to FIGS. 2, 3 & 4 there are shown three-dimensional graphs depicting the System Capacity as a function of factors α and β. The maximum value of system capacity achieved was 7.2 bits$^{-1}$Hz$^{-1}$cell$^{-1}$, which occurs when α=0.25 and β=0.5 when the correlation was 1.0 (FIG. 2). Corresponding measurements were made for the cases where the correlation in the shadowing loss was taken to be zero and one (FIGS. 3 and 4).

When the correlation is 0.0, the optimum capacity (7.4 bits$^{-1}$Hz$^{-1}$cell$^{-1}$) is achieved where the 0.25, and using α=β=0.5 incurs a loss of only 2%. Only when the correlation in the shadowing losses is perfect does the system capacity (7.7 bits$^{-1}$Hz$^{-1}$cell$^{-1}$) deviate from the optimum possible when α=β=0.5. The effects of the invention are such that those users which would normally experience outage due to fading are now less vulnerable because they are given a larger fade margin. Those users with line of sight (LOS or $R^2$) paths that do not experience much fading (not fast fading) but potentially produce the most interference, since they may have LOS paths to reuse cells, are reduced in output power an d thus interference is reduced. The term "reuse cells'" should be understood to cover "cells where the same carrier frequencies are re-used" which cause similar interference effects to be caused.

Following extensive simulation these two benefits, taken together, result in the possibility of increasing system capacity by 5 to 10% compared with the same system employing a conventional power control strategy. Not that the 5 to 10% increase in simulated capacity does not include the effects of reducing the margin required for multipath fading for those links with near line-of-sight paths. It has been determined that the system performance has been close to optimum when by $\alpha, \beta < 1$.

Upon installation of a fixed wireless subscriber system, it is proposed that the power control set-up is facilitated with adjustments to the distance loss being predetermined with reference to knowledge of the distance of the subscribers premises to the base station: initial values for $\beta$ can be based upon terrain knowledge, experience in similar areas, reference to a lookup table, adaptive testing dependent upon either a fixed number of previous communications or a cumulative total. Further, monthly system checking could be performed with the communications link power being adjusted, dependent upon results.

Since it is a requirement that the distance between the outstation and the base station is known, the approach used to accurately estimate excess loss this method is best suited to fixed access - since in this case we have a constant distance and free space path loss is constant (ignoring small effects of frequency change). The technique could be also be applied to mobile situations if it were possible to dynamically estimate free space path loss. This would, however, introduce extra computational complexity.

What is claimed is:

1. A radio communications power control system for controlling up-link signal power transmitted between an outstation and a base station, wherein the control system employs a power control algorithm, the transmitted signal power being controlled to be proportional to a product of loss due to free space (LossFS) and loss due to shadowing and interface (Loss SI), and wherein the algorithm is expressed as:

$$\text{Transmit Power} = \text{Constant} \times (\text{LossSI})^\alpha \times (\text{LossFS})^\beta,$$

where:

the loss due to free-space distance is LossFS;

the loss due to shadowing and interference is LossSI; and $\alpha$ and $\beta$ are constant parameters specifying the system.

2. A radio communications power control system as claimed in claim 1, wherein the constants $\alpha$ and $\beta$ are determined from a look up table.

3. A radio communications power control system as claimed in claim 1, wherein the constant $\alpha$ is determined from a look up table and the constant $\beta$ is varied on an adaptive basis.

4. A radio communications system as claimed in claim 1, wherein the system is a fixed wireless access system.

5. A radio communications network power control system, the network comprising a base station and a out station, wherein information relating to the distance between an outstation and a base station and information relating to channel excess loss is employed by the following power control algorithm:

$$\text{Transmit Power} = \text{Constant} \times (\text{LossSI})^\alpha \times (\text{LossFS})^\beta,$$

where:

the loss due to free-space distance is LossFS;

the loss due to shadowing and interference is LossSI; and $\alpha$ and $\beta$ are constant parameters specifying the system whereby the power control system can adjust power control accordingly.

6. In a radio communications power control system for controlling uplink signal power, a method of controlling transmitted signal power by employing a power control algorithm utilising distance information between an outstation and a base station and information relating to channel loss, the transmitted signal power being controlled to be proportional to a product of loss due to free space (LossFS) and loss due to shadowing and interference (LossSI), wherein the algorithm is expressed as:

$$\text{Transmit Power} = \text{Constant} \times (\text{LossSI})^\alpha \times (\text{LossFS})^\beta,$$

where:

the loss due to free-space distance is LossFS;

the loss due to shadowing and interference is LossSI; and $\alpha$ and $\beta$ are constant parameters specifying the system.

7. A method as claimed in claim 6, wherein the channel loss is excess channel loss.

8. A method as claimed in claim 6, wherein the constants $\alpha$ and $\beta$ are determined from a look up table.

9. A method as claimed in claim 6, wherein the constant $\alpha$ is determined from a look up table and the constant $\beta$ is varied on a adaptive basis.

10. A method as claimed in claim 6, wherein the system is a fixed wireless access system.

11. A method of controlling power in a radio communications network power control system, the network comprising a base station and a out station, wherein information relating to the distance between an outstation and a base station and information relating to channel excess loss is employed by the power control system according to the following power control algorithm:

$$\text{Transmit Power} = \text{Constant} \times (\text{LossSI})^\alpha \times (\text{LossFS})^\beta,$$

where:

the loss due to free-space distance is LossFS;

the loss due to shadowing and interference is LossSI; and $\alpha$ and $\beta$ are constant parameters specifying the system control system can adjust power control accordingly.

* * * * *